(12) United States Patent
Takahashi

(10) Patent No.: US 12,036,933 B2
(45) Date of Patent: Jul. 16, 2024

(54) POWER SWITCHING CONTROL SYSTEM

(71) Applicant: Yazaki Corporation, Tokyo (JP)

(72) Inventor: Atsushi Takahashi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 16 days.

(21) Appl. No.: 17/942,560

(22) Filed: Sep. 12, 2022

(65) Prior Publication Data

US 2023/0077522 A1   Mar. 16, 2023

(30) Foreign Application Priority Data

Sep. 14, 2021  (JP) ................................. 2021-149578

(51) Int. Cl.
| | |
|---|---|
| *B60R 16/033* | (2006.01) |
| *B60L 3/00* | (2019.01) |
| *H02J 7/00* | (2006.01) |
| *H02J 7/14* | (2006.01) |
| *H02M 3/158* | (2006.01) |

(52) U.S. Cl.
CPC .......... *B60R 16/033* (2013.01); *B60L 3/0046* (2013.01); *H02J 7/0048* (2020.01); *H02J 7/0068* (2013.01); *H02J 7/1423* (2013.01); *H02M 3/158* (2013.01)

(58) Field of Classification Search
CPC ....... B60R 16/03; H02J 7/0048; H02J 7/0068; H02J 7/1423; B60L 3/0046; H02M 3/158
See application file for complete search history.

(56) References Cited

U.S. PATENT DOCUMENTS

| | | | |
|---|---|---|---|
| 2008/0053716 A1* | 3/2008 | Scheucher | .......... H01M 50/204 320/124 |
| 2017/0197565 A1 | 7/2017 | Yoneyama et al. | |
| 2017/0349048 A1* | 12/2017 | Nakayama | ................ B60L 3/04 |
| 2018/0370465 A1* | 12/2018 | Sato | ...................... B60R 16/033 |
| 2020/0216002 A1 | 7/2020 | Mazaki et al. | |
| 2022/0169193 A1 | 6/2022 | Mazaki et al. | |

FOREIGN PATENT DOCUMENTS

| | | |
|---|---|---|
| JP | 2017-127112 A | 7/2017 |
| JP | 2019-62727 A | 4/2019 |
| JP | 2021-83214 A | 5/2021 |

* cited by examiner

*Primary Examiner* — Carlos Amaya
(74) *Attorney, Agent, or Firm* — Sughrue Mion, PLLC

(57) ABSTRACT

A power switching control system, includes a switching unit configured to switch connection and disconnection between loads set with operation priorities and powers supplying powers to the loads, the loads and the powers being connected to a power supply path; a power failure detection unit detecting a power failure caused by an abnormality on a power supply side or a load side; and a control unit controlling the switching unit. When the power failure detection unit detects the power failure, and remaining capacities, charging rates, or voltages of the plurality of powers are less than, or equal to or less than predetermined thresholds, the control unit disconnects the loads from the power supply path by the switching unit in an order from one of the loads with a lowest operation priority of the operation priorities to gradually decrease supply currents from the powers to the loads.

3 Claims, 11 Drawing Sheets

FIG. 3

| | IMPORTANT LOAD | PRIORITY | CONSUMPTION CURRENT (RATED) | TIME STEP | | |
|---|---|---|---|---|---|---|
| | | | | 1 | 2 | 3 |
| THIRD SWITCH | IL1 | HIGH | 20A | ON | ON | ON |
| FOURTH SWITCH | IL2 | MIDDLE | 20A | ON | ON | OFF |
| FIFTH SWITCH | IL3 | LOW | 20A | ON | OFF | OFF |
| TRANSITION OF CONSUMPTION CURRENT | | | | 60A | 40A | 20A |

FIG. 4

| | IMPORTANT LOAD | PRIORITY | CONSUMPTION CURRENT (RATED) | TIME STEP | | |
|---|---|---|---|---|---|---|
| | | | | 1 | 2 | 3 |
| THIRD SWITCH | IL1 | HIGH | 20A | ON | ON | ON |
| FOURTH SWITCH | IL2 | MIDDLE | 20A | ON | OFF | OFF |
| FIFTH SWITCH | IL3 | LOW | 20A | OFF | OFF | OFF |
| TRANSITION OF CONSUMPTION CURRENT | | | | 40A | 20A | 20A |

FIG. 5

| | IMPORTANT LOAD | PRIORITY | CONSUMPTION CURRENT (RATED) | TIME STEP | | |
|---|---|---|---|---|---|---|
| | | | | 1 | 2 | 3 |
| THIRD SWITCH | IL1 | HIGH | 20A | ON | ON | ON |
| FOURTH SWITCH | IL2 | MIDDLE | 20A | OFF | OFF | OFF |
| FIFTH SWITCH | IL3 | LOW | 20A | ON | OFF | OFF |
| TRANSITION OF CONSUMPTION CURRENT | | | | 40A | 20A | 20A |

FIG. 6

| | IMPORTANT LOAD | PRIORITY | CONSUMPTION CURRENT (RATED) | TIME STEP | | |
|---|---|---|---|---|---|---|
| | | | | 1 | 2 | 3 |
| THIRD SWITCH | IL1 | HIGH | 20A | OFF | OFF | OFF |
| FOURTH SWITCH | IL2 | MIDDLE | 20A | ON | ON | ON |
| FIFTH SWITCH | IL3 | LOW | 20A | ON | OFF | OFF |
| TRANSITION OF CONSUMPTION CURRENT | | | | 40A | 20A | 20A |

POWER SWITCHING CONTROL SYSTEM

CROSS-REFERENCE TO RELATED APPLICATIONS

This application is based on and claims priority under 35 USC 119 from Japanese Patent Application No. 2021-149578 filed on Sep. 14, 2021, the contents of which are incorporated herein by reference.

TECHNICAL FIELD

The present disclosure relates to a power switching control system.

BACKGROUND ART

In an in-vehicle power system in which a main power, a sub power, and a plurality of auxiliary loads are connected in parallel, it is known that when an output power from the main power drops, more power is supplied from the sub power to the auxiliary load with a high operation priority as disclosed, for example, in JP2017-127112A. In an in-vehicle power system including a plurality of power systems for a redundant operation, it is known that even if an abnormality occurs in some power systems, a power and a load of the power system where the abnormality occurs are continued to be used as much as possible as disclosed, for example, JP2019-062727A.

In the in-vehicle power system described in JP2017-127112A, a redundant operation becomes impossible when a failure occurs in a DC/DC converter that adjusts the power supplied from the sub power to each auxiliary load. That is, a dependence on the DC/DC converter is high and a reliability is low. In addition, the DC/DC converter is expensive and large.

In the in-vehicle power system described in JP2019-062727A, if a remaining capacity of the power (storage battery) of the power system where the abnormality occurs is insufficient, it is considered that a load with a high operation priority cannot be continued to be used.

SUMMARY OF INVENTION

The present disclosure provides a power switching control system where a plurality of powers are connected in parallel to a power supply path for a redundant operation and a plurality of loads are connected in parallel to the power supply path, when a power failure occurs due to an abnormality on a power side or a load side, even if a remaining capacity of the power is insufficient, the power can supply to a load with a high operation priority during a required time.

A power switching control system, includes a switching unit configured to switch connection and disconnection between a plurality of loads set with operation priorities and a plurality of powers supplying powers to the plurality of loads, the plurality of loads and the plurality of powers being connected in parallel to a power supply path; a power failure detection unit configured to detect a power failure caused by an abnormality on a power supply side or a load side; and a control unit configured to control the switching unit. When the power failure detection unit detects the power failure, and remaining capacities, charging rates, or voltages of the plurality of powers are less than, or equal to or less than predetermined thresholds, the control unit disconnects the plurality of loads from the power supply path by the switching unit in an order from one of the loads with a lowest operation priority of the operation priorities to gradually decrease supply currents from the powers to the loads.

BRIEF DESCRIPTION OF DRAWINGS

FIG. 3 is a table showing controls of a third to fifth switches under a condition where a power failure occurs due to an abnormality on a main battery side or a sub battery side, a remaining capacity [Ah] of a normal battery is less than a threshold, and a power supplied to an important load with a priority 1 is maintained during an evacuation driving time;

FIG. 4 is a table showing controls of the third to fifth switches under a condition where a power failure occurs due to an abnormality on an important load side with a priority 3, remaining capacities [Ah] of the main battery and the sub battery are less than a threshold, and the power supplied to the important load with the priority 1 is maintained during the evacuation driving time;

FIG. 5 is a table showing controls of the third to fifth switches under a condition where a power failure occurs due to an abnormality on an important load side with a priority 2, the remaining capacities [Ah] of the main battery and the sub battery are less than the threshold, and the power supplied to the important load with the priority 1 is maintained during the evacuation driving time;

FIG. 6 is a table showing controls of the third to fifth switches under a condition where a power failure occurs due to an abnormality on an important load side with the priority 1, the remaining capacities [Ah] of the main battery and the sub battery are less than the threshold, and the power supplied to an important load with the priority 2 is maintained during the evacuation driving time;

DESCRIPTION OF EMBODIMENTS

Hereinafter, the present disclosure will be described according to preferred embodiments. The present disclosure is not limited to the embodiments to be described below, and the embodiments to be described below can be appropriately modified without departing from the gist of the present disclosure. In the embodiments to be described below, some configurations are not illustrated or described, and a known or well-known technique is applied as appropriate to details of an omitted technique within a range where no contradiction occurs to contents to be described below.

Figure 1:
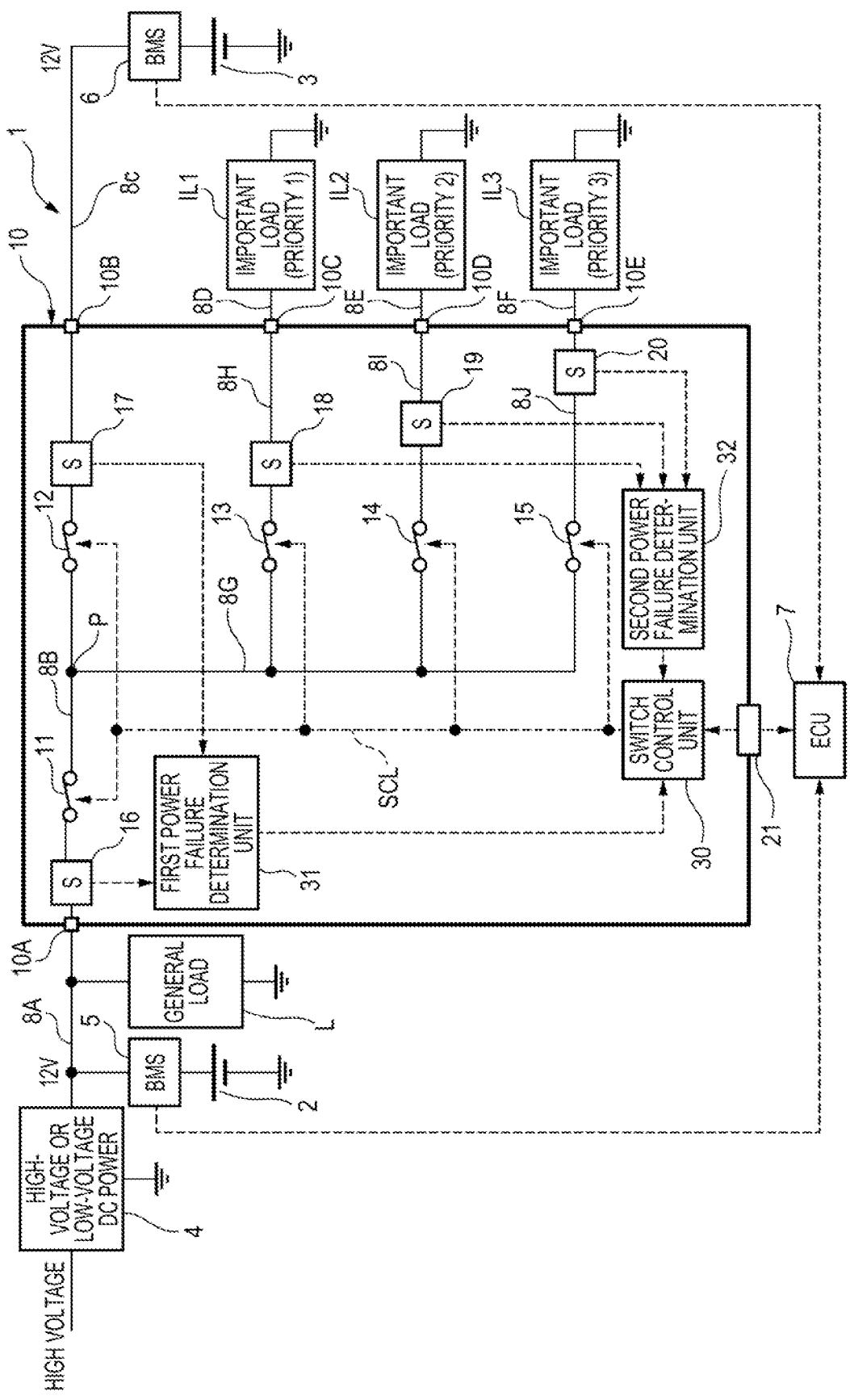
FIG. 1 is a diagram showing an in-vehicle power system including a power switching control system according to an embodiment of the present disclosure.

FIG. 1 is a diagram showing an in-vehicle power system 1 including a power switching control system 10 according to an embodiment of the present disclosure. As shown in FIG. 1, the in-vehicle power system 1 includes a main battery 2, a sub battery 3, a high-voltage or low-voltage DC power 4, and the power switching control system 10. In the in-vehicle power system 1, the main battery 2 and the sub battery 3 are connected in parallel to a general load L and a plurality of important loads IL1 to IL3 (three in the present embodiment). In the in-vehicle power system 1, powers are supplied from the main battery 2 and the sub battery 3 to the general load L and the important loads IL1 to IL3 during normal driving. That is, in the in-vehicle power system 1, the power is redundant during the normal driving. The power is not redundant when a vehicle is stopped.

The in-vehicle power system 1 includes a battery management system (BMS) 5 that manages the main battery 2, a BMS 6 that manages the sub battery 3, and an electronic control unit (ECU) 7 that controls the entire in-vehicle power system 1. The BMS 5 transmits information on a state (remaining capacity [Ah], state of charge (SOC) [%], and power voltage [V]) of the main battery 2 to the ECU 7, and the BMS 6 transmits information on a state (remaining capacity [Ah], SOC [%], and power voltage [V]) of the sub battery 3 to the ECU 7.

An output terminal of the high-voltage or low-voltage DC power 4 and an input terminal 10A of the power switching control system 10 are connected by a power supply line 8A. The main battery 2 is connected to the power supply line 8A via the BMS 5, and the general load L is also connected to the power supply line 8A.

Examples of the main battery 2 include a 12 V lead battery or lithium ion battery. In the present embodiment, the main battery 2 is a 12 V lead battery. Examples of the general load L include an air conditioner (A/C), an audio, a side-marker light, a fog lamp, and a defogger (defroster).

The high-voltage or low-voltage DC power 4 includes a DC/DC converter (not shown) that steps down a high voltage such as 48 V to a low voltage such as 12 V, and outputs a low-voltage power to the main battery 2, the sub battery 3, the general load L, the important loads IL1 to IL3, the power switching control system 10, and the like.

The input terminal 10A and an input or output terminal 10B of the power switching control system 10 are connected by a power supply line 8B, and the input or output terminal 10B of the power switching control system 10 and the sub battery 3 are connected by a power supply line 8C via the BMS 6.

Examples of the sub battery 3 include a 12 V lithium ion battery or nickel-metal hydride battery that can be connected to a lead battery, or a lead battery. In the present embodiment, the sub battery 3 is a lithium ion battery that can be connected to a lead battery.

The power switching control system 10 is provided with a plurality of output terminals 10C, 10D, and 10E. The output terminal 10C and the important load IL1 are connected by a power supply line 8D, the output terminal 10D and the important load IL2 are connected by a power supply line 8E, and the output terminal 10E and the important load IL3 are connected by a power supply line 8F.

Examples of the important load IL1 with a highest operation priority (hereinafter, referred to as the priority 1) may include an electric brake, an electric parking brake, an auxiliary device of an electric steering device (steer by wire (SBW)), a door lock device, an electronic power steering device, an auxiliary device of an advanced driver-assistance system (ADAS), a main power of a data communication module (DCM), a main power of an air bag device, a camera, a headlamp on a driver side, and a head-up display.

Examples of the important load IL2 with a second high operation priority (hereinafter, referred to as the priority 2) may include the ECU 7, a main device of the electric steering device, a main device of the ADAS, a remote parking ECU, a meter, and a camera. Examples of the important load IL3 with a third high operation priority (hereinafter, referred to as the priority 3) may include a skid or slip prevention device (vehicle dynamic control (VDC)) and a headlamp on a passenger side.

The power switching control system 10 includes a first switch 11 and a second switch 12. The first switch 11 and the second switch 12 are provided on the power supply line 8B. The first switch 11 is provided on an input terminal 10A side (that is, a main battery 2 side), and the second switch 12 is provided on an input or output terminal 10B side (that is, a sub battery 3 side).

A power supply line 8G is connected between the first switch 11 and the second switch 12 in the power supply line 8B. The power supply line 8G and the output terminal 10C are connected by a power supply line 8H, the power supply line 8G and the output terminal 10D are connected by a power supply line 8I, and the power supply line 8G and the output terminal 10E are connected by a power supply line 8J. That is, the important load IL1 with the priority 1 is connected to the power supply line 8G by the power supply lines 8D and 8H, the important load IL2 with the priority 2 is connected to the power supply line 8O by the power supply lines 8E and 8I, and the important load IL3 with the priority 3 is connected to the power supply line 8G by the power supply lines 8F and 8J. Accordingly, the important loads IL1 to IL3 are connected in parallel to the power supply line 8G.

The in-vehicle power system 1 is divided into the main battery 2 side and the sub battery 3 side with a connection point P between the power supply line 8B and the power supply line 8G as a boundary. The first switch 11 is provided on the main battery 2 side, and connects or disconnects the main battery 2, the high-voltage or low-voltage DC power 4, and the general load L to or from the power switching control system 10. Meanwhile, the second switch 12 is provided on the sub battery 3 side, and connects or disconnects the sub battery 3 to or from the power switching control system 10.

The power switching control system 10 includes a third switch 13, a fourth switch 14, and a fifth switch 15. The third switch 13 is provided on the power supply line 8H that connects the important load IL1 with the priority 1 to the power supply line 8G. The fourth switch 14 is provided on the power supply line 8I that connects the important load IL2 with the priority 2 to the power supply line 8G. The fifth switch 15 is provided on the power supply line 8J that connects the important load IL3 with the priority 3 to the power supply line 8G.

The third switch 13 connects or disconnects the important load IL1 with the priority 1 to or from the power supply line 8O. The fourth switch 14 connects or disconnects the important load IL2 with the priority 2 to or from the power supply line 8G. The fifth switch 15 connects or disconnects the important load IL3 with the priority 3 to or from the power supply line 8G.

Examples of the first to fifth switches 11 to 15 may include a semiconductor relay such as a metal-oxide-semiconductor field-effect transistor (MOSFET), and a mechanical relay. The power switching control system 10 includes a switch control unit 30. The first to fifth switches 11 to 15 are connected to the switch control unit 30 by a switch control line SCL, and connection or disconnection (ON or OFF) is switched by a control signal transmitted from the switch control unit 30.

The switch control unit 30 is communicably connected to the ECU 7 via a communication interface 21. The ECU 7 transmits, to the switch control unit 30, the information on the state of the main battery 2 received from the BMS 5 and the information on the state of the sub battery 3 received from the BMS 6.

The power switching control system 10 includes first to fifth current or voltage sensors 16 to 20, a first power failure determination unit 31, and a second power failure determination unit 32. The first to fifth current or voltage sensors 16 to 20 measure at least one of a current value [A] and a voltage value [V] and transmit the value to the first power failure determination unit 31 and the second power failure determination unit 32.

The first current or voltage sensor 16 is provided between the input terminal 10A and the first switch 11 on the power supply line 8B, and the second current or voltage sensor 17 is provided between the second switch 12 and the input or output terminal 10B on the power supply line 88. The third current or voltage sensor 18 is provided between the third switch 13 and the output terminal 10C, the fourth current or voltage sensor 19 is provided between the fourth switch 14 and the output terminal 10D, and the fifth current or voltage sensor 20 is provided between the fifth switch 15 and the output terminal 10E.

The first power failure determination unit 31 determines presence of a power failure according to at least one of the current values [A] and the voltage values [V] received from the first current or voltage sensor 16 and the second current or voltage sensor 17, or a difference ΔV (potential difference) of the received voltage values [V] and a positive or negative (current direction) of the current values [A]. In particular, when the power failure occurs, the first power failure determination unit 31 determines which of an abnormality on the main battery 2 side and an abnormality on the sub battery 3 side causes the power failure. The first power failure determination unit 31 transmits a determination result to the switch control unit 30.

The second power failure determination unit 32 determines the presence of the power failure according to at least one of the current values [A] and the voltage values [V] received from the third to fifth current or voltage sensors 18 to 20. In particular, when the power failure occurs, the second power failure determination unit 32 determines which of abnormalities on the important loads IL1 to IL3 causes the power failure. The second power failure determination unit 32 transmits a determination result to the switch control unit 30.

Examples of the power failure may include a momentary interruption or instantaneous power failure caused by a failure (internal short) of the high-voltage or low-voltage DC power 4, a ground fault, or the like, a voltage drop caused by a failure (output drop) of the high-voltage or low-voltage DC power 4, deterioration of the main battery 2 or the sub battery 3, or the like, and a voltage fluctuation caused by a failure or the like of the high-voltage or low-voltage DC power 4.

As thresholds of determination conditions of the first power failure determination unit 31, for example, a normal voltage value [V] may be set to 8 V or more and 16 V or less, a voltage drop threshold may be set to less than 8 V, and an overcurrent threshold may be set to 150 A or more. As thresholds of determination conditions of the second power failure determination unit 32, for example, a voltage drop threshold may be set to S V or less, and an overcurrent threshold may be set to 30 A or more.

The switch control unit 30 has a self-diagnosis (DIAG; diagnostic) function, and transmits a DIAG signal to the ECU 7 when the switch control unit 30 receives the determination result of the presence of the power failure from the first power failure determination unit 31 or the second power failure determination unit 32. The DIAG signal includes information on an abnormal state (detailed information on an abnormality that causes the power failure or the like) of the in-vehicle power system 1, and information such as measurement values of the first to fifth current or voltage sensors 16 to 20.

The switch control unit 30 turns on all the first to fifth switches 11 to 15 when a voltage on the main battery 2 side and a voltage on the sub battery 3 side are in competition. Accordingly, the high-voltage or low-voltage DC power 4 supplies the power to the main battery 2, the sub battery 3, the general load L, and the important loads IL1 to IL3.

The switch control unit 30 turns on all the first to fifth switches 11 to 15 even when the sub battery 3 is charged. Accordingly, the high-voltage or low-voltage DC power 4 supplies the power to the main battery 2, the sub battery 3, the general load L, and the important loads IL1 to IL3. When the sub battery 3 is charged, the second switch 12 is kept ON until the sub battery 3 is fully charged. During this time, a power redundancy control is not executed and the ADAS system stops automatic driving and sets the automatic driving to manual driving.

Further, the switch control unit 30 turns off the second switch 12 when the sub battery 3 is fully charged (here, the voltage on the main battery 2 side>the voltage on the sub battery 3 side). Accordingly, the high-voltage or low-voltage DC power 4 supplies the power to the main battery 2, the general load L, and the important loads IL1 to IL3.

In addition, when the switch control unit 30 receives, from the ECU 7, a signal notifying a start of idling stop of the vehicle, the switch control unit 30 turns off the first switch 11 and turns on the second switch 12. Further, the third to fifth switches 13 to 15 are turned on. Accordingly, the high-voltage or low-voltage DC power 4 is disconnected from the important loads IL1 to IL3, and the sub battery 3 is connected to the important loads IL1 to IL3 to supply the power to the important loads IL1 to IL3.

Here, when the vehicle is a gasoline vehicle, the high-voltage or low-voltage DC power 4 is an alternator, and an output voltage fluctuates due to cranking when an engine is restarted from the idling stop. Therefore, at the time of the idling stop, the switch control unit 30 temporarily turns off the first switch 11 to disconnect the high-voltage or low-voltage DC power 4 from the important loads IL1 to IL3, and switches the power supply from the sub battery 3 to the important loads IL1 to IL3. Accordingly, an influence of the voltage fluctuation of the high-voltage or low-voltage DC power 4 is prevented from reaching the important loads IL1 to IL3 when the engine is restarted from the idling stop.

The switch control unit 30 turns off the first switch 11 when the first power failure determination unit 31 determines that the power failure occurs due to the abnormality on the main battery 2 side. Accordingly, the main battery 2 side having the abnormality is disconnected from the in-vehicle power system 1, and the power supply from the sub battery 3 in the normal state to the important loads IL1 to IL3 is maintained. Meanwhile, the switch control unit 30 turns off the second switch 12 when the first power failure determination unit 31 determines that the power failure occurs due to the abnormality on the sub battery 3 side.

Accordingly, the sub battery 3 side having the abnormality is disconnected from the in-vehicle power system 1, and the power supply from the main battery 2 in the normal state to the important loads IL1 to IL3 is maintained.

When the second power failure determination unit 32 determines that the power failure occurs due to the abnormality on any side of the important loads IL1 to IL3, the switch control unit 30 turns off the switch (any of the third to fifth switches 13 to 15) corresponding to any of the important loads IL1 to IL3 which has the abnormality. Accordingly, any of the important loads IL1 to IL3 which has the abnormality is disconnected from the in-vehicle power system 1, and the power supply to the left loads of the important loads IL1 to IL3 which are in the normal state is maintained.

By the way, in the vehicle equipped with the ADAS system (automatic driving function), examples of a function related to the autonomous driving include a determination function of the main device or the auxiliary device of the ADAS, a display function of the meter and the head-up display, a braking function of the skid or slip prevention device or the electric brake, a steering function of the main device and the auxiliary device of the electric steering device, and a cognitive function of the camera and the headlamp. During autonomous driving of the vehicle equipped with the ADAS system, when the first power failure determination unit 31 or the second power failure determination unit 32 determines that the power failure occurs, that is, when it is found that the power supply to at least one of the important loads IL1 to IL3 realizing the functions related to the autonomous driving cannot be maintained, the vehicle needs to be stopped in a safe place.

Here, it is necessary to maintain the power supply to the normal important loads IL1 to IL3 for a time from the autonomous driving to the stop of the vehicle in a safe place (hereinafter, referred to as the evacuation driving time). For example, assuming that the evacuation driving time is 180 seconds or more, if a consumption current of the important loads IL1 to IL3 is 60 [A], the remaining capacity [Ah] of the main battery 2 or the sub battery 3 is required to be 3 Ah or more.

Therefore, when it is found that the switch control unit 30 cannot maintain the power supply to at least one of the important loads IL1 to IL3 during the autonomous driving, ON and OFF controls of the third to fifth switches 13 to 15 are executed such that the power supply to the important load IL1 (or IL2) with a high operation priority is maintained during the evacuation driving time. Hereinafter, the process of the power switching control system 10 when the vehicle is retracted will be described.

Figure 2:
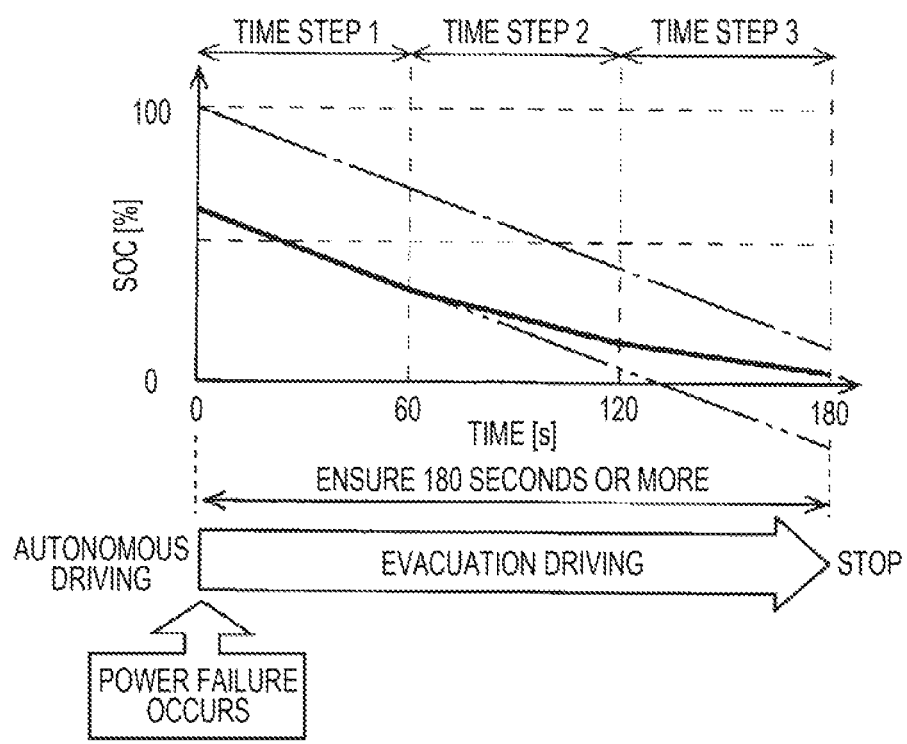
FIG. 2 is a graph showing a transition of a charging rate [%] of a main battery or a sub battery from autonomous driving to stop.

FIG. 2 is a graph showing a transition of the charging rate (SOC [%]) of the main battery 2 or the sub battery 3 from the autonomous driving to the stop (during the evacuation driving time). As shown by a dotted and dashed line in this graph, when the main battery 2 or the sub battery 3 is fully charged (SOC=100%), the power supply to all the important loads IL1 to IL3 can be maintained during the evacuation driving time. Meanwhile, as shown by a double-dotted chain line in this graph, if all the third to fifth switches 13 to 15 are kept ON during the evacuation driving time depending on the charging rate of the main battery 2 or the sub battery 3, it may not be possible to maintain the power supply to all the important loads IL1 to IL3.

Therefore, when the first power failure determination unit 31 determines that the power failure on the main battery 2 side occurs, and the remaining capacity [Ah] of the sub battery 3 is equal to or higher than the threshold (for example, 3 Ah), the switch control unit 30 turns off the first switch 11, keeps the second switch 12 ON, and keeps the third to fifth switches 13 to 15 ON. Accordingly, the power supply from the sub battery 3 to all the important loads IL1 to IL3 is maintained during the evacuation driving time. Meanwhile, when the first power failure determination unit 31 determines that the power failure on the main battery 2 side occurs, and the remaining capacity [Ah] of the sub battery 3 is less than the threshold, the switch control unit 30 turns off the first switch 11, keeps the second and third switches 12 and 13 ON, and turns off the fourth and fifth switches 14 and 15 in an order of the fifth switch 15 and the fourth switch 14. That is, in this case, the fourth and fifth switches 14 and 15 are turned off in an order from the one with a lower operation priority of the corresponding important load IL2 and IL3. Accordingly, a supply current from the sub battery 3 to the important loads IL1 to IL3 is gradually reduced during the evacuation driving time, and a discharge time of the sub battery 3 is extended, so that the power supply to the important load IL1 with the priority 1 is maintained.

In addition, when the first power failure determination unit 31 determines the power failure due to the abnormality on the sub battery 3 side, and the remaining capacity [Ah] of the main battery 2 is equal to or higher than the threshold (for example, 3 Ah), the switch control unit 30 turns off the second switch 12, keeps the first switch 11 ON, and keeps the third to fifth switches 13 to 15 ON. Accordingly, the power supply from the main battery 2 to all the important loads IL1 to IL3 is maintained during the evacuation driving time. Meanwhile, when the first power failure determination unit 31 determines the power failure due to the abnormality on the sub battery 3 side, and the remaining capacity [Ah] of the main battery 2 is less than the threshold, the switch control unit 30 turns off the second switch 12, keeps the first and third switches 11 and 13 ON, and turns off the fourth and fifth switches 14 and 15 in an order of the fifth switch 15 and the fourth switch 14. Accordingly, a supply current from the main battery 2 to the important loads IL1 to IL3 is gradually reduced during the evacuation driving time, and a discharge time of the main battery 2 is extended, so that the power supply to the important load IL1 with the priority 1 is maintained.

FIG. 3 is a table showing controls of the third switch to the fifth switch 13 to 15 under a condition where the power failure occurs due to the abnormality on the main battery 2 side or the sub battery 3 side, the remaining capacity [Ah] of the normal battery is less than the threshold, and the power supply to the important load IL1 with the priority 1 is maintained during the evacuation driving time. As shown in this table, in a first stage (Time Step 1 in FIG. 2) of the evacuation driving time, the third to fifth switches 13 to 15 are kept ON. Then, in a second stage (Time Step 2 in FIG. 2) of the evacuation driving time, the fifth switch 15 corresponding to the important load IL3 with the priority 3 (low) is turned off, and in a third stage (Time Step 3 in FIG. 2) of the evacuation driving time, the fourth switch 14 corresponding to the important load IL2 with the priority 2 (middle) is turned off. Accordingly, the supply current from the main battery 2 or the sub battery 3 to the important loads IL1 to IL3 is gradually reduced to, for example, 60 A, 40 A, and 20 A.

In addition, when the second power failure determination unit 32 determines the power failure due to an abnormality on an important load IL3 side with the priority 3, and the remaining capacity [Ah] of the main battery 2 or the sub battery 3 is equal to or higher than the threshold (for example, 3 Ah), the switch control unit 30 keeps the first to fourth switches 11 to 14 ON, and turns off the fifth switch 15. Accordingly, the power supply from the main battery 2 and the sub battery 3 to the important loads IL1 and IL2 is maintained during the evacuation driving time. Meanwhile, when the second power failure determination unit 32 determines the power failure due to the abnormality on the important load IL3 side with the priority 3, and the remaining capacities [Ah] of the main battery 2 and the sub battery 3 are less than the threshold, the switch control unit 30 keeps the first to third switches 11 to 13 ON, turns off the fifth switch 15, and turns off the fourth switch 14 in the middle of the evacuation driving time. Accordingly, a supply current from the main battery 2 or the sub battery 3 to the important loads IL1 and IL2 with the priorities 1 and 2 is gradually reduced during the evacuation driving time, and the discharge times of the main battery 2 and the sub battery 3 are extended, so that the power supply to the important load IL1 with the priority 1 is maintained.

FIG. 4 is a table showing controls of the third to the fifth switches 13 to 15 under a condition where the power failure occurs due to an abnormality on the important load IL3 side with the priority 3 (low), the remaining capacities [Ah] of the main battery 2 and the sub battery 3 are less than the threshold, and the power supply to the important load IL1 with the priority 1 (high) is maintained during the evacuation driving time. As shown in this table, in the first stage (Time Step 1) of the evacuation driving time, the fifth switch 15 corresponding to the important load IL3 with the priority 3 is turned off, and the third and fourth switches 13 and 14 corresponding to the important loads IL1 and IL2 with the priorities 1 and 2 are kept ON. Next, in the second stage (Time Step 2) of the evacuation driving time, the fourth switch 14 corresponding to the important load IL2 with the priority 2 (middle) is turned off. Then, in the third stage (Time Step 3) of the evacuation driving time, the third switch 13 corresponding to the important load IL1 with the priority 1 (middle) is kept ON. Accordingly, the supply currents from the main battery 2 and the sub battery 3 to the important loads IL1 and IL2 with the priorities 1 and 2 are gradually reduced to, for example, 40 A, 20 A, and 20 A during the evacuation driving time.

In addition, when the second power failure determination unit 32 determines the power failure due to an abnormality on an important load IL2 side with the priority 2, and the remaining capacity [Ah] of the main battery 2 or the sub battery 3 is equal to or higher than the threshold (for example, 3 Ah), the switch control unit 30 keeps the first to third switches 11 to 13 and the fifth switch 15 ON, and turns off the fourth switch 14. Accordingly, the power supply from the main battery 2 and the sub battery 3 to the important loads IL1 and IL3 is maintained during the evacuation driving time. Meanwhile, when the second power failure determination unit 32 determines the power failure on the important load IL2 side with the priority 2, and the remaining capacities [Ah] of the main battery 2 and the sub battery 3 are less than the threshold, the switch control unit 30 keeps the first to third switches 11 to 13 ON, turns off the fourth switch 14, and turns off the fifth switch 15 in the middle of the evacuation driving time. Accordingly, the supply currents from the main battery 2 and the sub battery 3 to the important loads IL1 and IL3 with the priorities 1 and 3 are gradually reduced during the evacuation driving time, and the discharge times of the main battery 2 and the sub battery 3 are extended, so that the power supply to the important load IL1 with the priority 1 is maintained.

FIG. 5 is a table showing controls of the third to the fifth switches 13 to 15 under a condition where the power failure occurs due to the abnormality on the important load IL2 side with the priority 2 (middle), the remaining capacities [Ah] of the main battery 2 and the sub battery 3 are less than the threshold, and the power supply to the important load IL1 with the priority 1 (high) is maintained during the evacuation driving time. As shown in this table, in the first stage (Time Step 1) of the evacuation driving time, the fourth switch 14 corresponding to the important load IL2 with the priority 2 is turned off, and the third and fifth switches 13 and 15 corresponding to the important loads IL1 and IL3 with the priorities 1 and 3 (low) are kept ON. Next, in the second stage (Time Step 2) of the evacuation driving time, the fifth switch 15 corresponding to the important load IL3 with the priority 3 is turned off. Then, in the third stage (Time Step 3) of the evacuation driving time, the third switch 13 corresponding to the important load IL1 with the priority 1 (middle) is kept ON. Accordingly, the supply currents from the main battery 2 and the sub battery 3 to the important loads IL1 and IL3 with the priorities 1 and 3 are gradually reduced to, for example, 40 A, 20 A, and 20 A during the evacuation driving time.

In addition, when the second power failure determination unit 32 determines that the power failure occurs due to an abnormality on an important load IL1 side with the priority 1, and the remaining capacity [Ah] of the main battery 2 or the sub battery 3 is equal to or higher than the threshold (for example, 3 Ah), the switch control unit 30 keeps the first, second, fourth, and fifth switches 11, 12, 14, and 15 ON, and turns off the third switch 13. Accordingly, the power supply from the main battery 2 and the sub battery 3 to the important loads IL2 and IL3 with the priorities 2 and 3 is maintained during the evacuation driving time. Meanwhile, when the second power failure determination unit 32 determines the power failure due to the abnormality on the important load IL1 side with the priority 1, and the remaining capacities [Ah] of the main battery 2 and the sub battery 3 are less than the threshold, the switch control unit 30 keeps the first, second, fourth, and fifth switches 11, 12, 14, and 15 ON, turns off the third switch 13, and turns off the fifth switch 15 in the middle of the evacuation driving time. Accordingly, the supply currents from the main battery 2 and the sub battery 3 to the important loads IL2 and IL3 with the priorities 2 and 3 are gradually reduced during the evacuation driving time, and the discharge times of the main battery 2 and the sub battery 3 are extended, so that the power supply to the important load IL2 with the priority 2 is maintained.

FIG. 6 is a table showing controls of the third to the fifth switches 13 to 15 under a condition where the power failure occurs due to the abnormality on the important load IL1 side with the priority 1 (high), the remaining capacities [Ah] of the main battery 2 and the sub battery 3 are less than the threshold, and the power supply to the important load IL2 with the priority 2 (middle) is maintained during the evacuation driving time. As shown in this table, in the first stage (Time Step 1) of the evacuation driving time, the third switch 13 corresponding to the important load IL1 with the priority 1 is turned off, and the fourth and fifth switches 14 and 15 corresponding to the important loads IL2 and IL3 with the priorities 2 and 3 (low) are kept ON. Next, in the second stage (Time Step 2) of the evacuation driving time, the fifth switch 15 corresponding to the important load IL3 with the priority 3 is turned off. Then, in the third stage (Time Step 3) of the evacuation driving time, the fourth switch 14 corresponding to the important load IL2 with the priority 2 (middle) is kept ON. Accordingly, the supply currents from the main battery 2 and the sub battery 3 to the important loads IL2 and IL3 with the priorities 2 and 3 are gradually reduced to, for example, 40 A, 20 A, and 20 A during the evacuation driving time.

FIG. 7 to FIG. 10 are flowcharts for illustrating processes of the power switching control system 10 of the present embodiment. The processes shown in the flowcharts are started when the vehicle starts, and the process proceeds to step S1.

In step S1, the switch control unit 30 turns on all the first to fifth switches 11 to 15. Accordingly, the main battery 2 and the sub battery 3 are connected to the general load L and the important loads IL1 to IL3, and the power is supplied to the general load L and the important loads IL1 to IL3. In addition, the switch control unit 30 acquires, from the ECU 7, the information on the remaining capacity [Ah] of the main battery 2 held by the BMS 5 and the information on the remaining capacity [Ah] of the sub battery 3 held by the BMS 6.

Next, in step S2, the second power failure determination unit 32 determines whether all the important loads IL1 to IL3 are in a (normal) state where an abnormality such as an overcurrent does not occur. If an affirmative determination is made in step S2, the process proceeds to step S3, and if a negative determination is made in step S2, the process proceeds to step S21 of FIG. 9.

In step S3, the first power failure determination unit 31 determines whether both the main battery 2 side and the sub battery 3 side are in a (normal) state where no power failure occurs. If an affirmative determination is made in step S3, the process proceeds to step S4, and if a negative determination is made in step S3, the process proceeds to step S31.

In step S4, the switch control unit 30 determines whether the vehicle stops. If an affirmative determination is made in step S4, the process ends, and if a negative determination is made in step S4, the process proceeds to step S1.

In step S31, the first power failure determination unit 31 determines whether the power failure occurs due to the abnormality on the main battery 2 side or the power failure occurs due to the abnormality on the sub battery 3 side. If it is determined in step S31 that the power failure occurs due to the abnormality on the main battery 2 side, the process proceeds to step S32, and if it is determined in step S31 that the power failure occurs due to the abnormality on the sub battery 3 side, the process proceeds to step S311 of FIG. 8.

In step S32, the switch control unit 30 turns off the first switch 11. Next, in step S33, the switch control unit 30 transmits a DIAG signal to the ECU 7. Next, in step S34, the switch control unit 30 determines whether the remaining capacity [Ah] of the sub battery 3 is 3 Ah or more. If an affirmative determination is made in step S34, the process proceeds to step S35, and if a negative determination is made in step S34, the process proceeds to step S36.

In step S35, the switch control unit 30 keeps the third to fifth switches 13 to 15 ON, and maintains the power supply from the sub battery 3 to the important loads IL1 to IL3. The process proceeds from step S35 to step S4. Meanwhile, in step S36, the switch control unit 30 keeps the third to fifth switches 13 to 15 ON in the first stage (Time Step 1) of the evacuation driving time. Next, in step S37, the switch control unit 30 turns off the fifth switch 15 in the second stage (Time Step 2) of the evacuation driving time. Next, in step S38, the switch control unit 30 turns off the fourth switch 14 in the second stage (Time Step 3) of the evacuation driving time. The process proceeds from step S38 to step S4.

Figure 8:
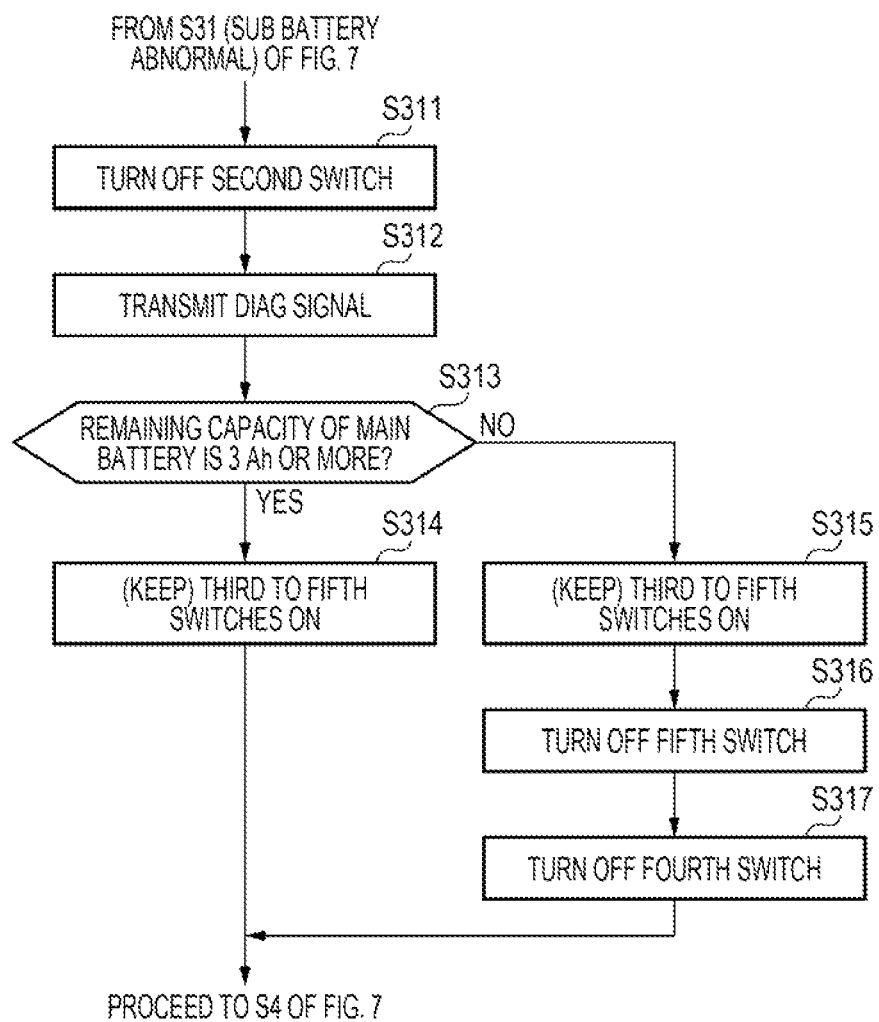
FIG. 8 is a flowchart for illustrating a process of the power switching control system of FIG. 1.

In step S311 of FIG. 8, the switch control unit 30 turns off the second switch 12. Next, in step S312, the switch control unit 30 transmits the DIAG signal to the ECU 7. Next, in step S313, the switch control unit 30 determines whether the remaining capacity [Ah] of the main battery 2 is 3 Ah or more. If an affirmative determination is made in step S313, the process proceeds to step S314, and if a negative determination is made in step S313, the process proceeds to step S315.

In step S314, the switch control unit 30 keeps the third to fifth switches 13 to 15 ON, and maintains the power supply from the main battery 2 to the important loads IL1 to IL3. The process proceeds from step S314 to step S4 of FIG. 7. Meanwhile, in step S315, the switch control unit 30 keeps the third to fifth switches 13 to 15 ON in the first stage (Time Step 1) of the evacuation driving time. Next, in step S316, the switch control unit 30 turns off the fifth switch 15 in the second stage (Time Step 2) of the evacuation driving time. Next, in step S317, the switch control unit 30 turns off the fourth switch 14 in the third stage (Time Step 3) of the evacuation driving time. The process proceeds from step S317 to step S4 of FIG. 7.

Figure 9:
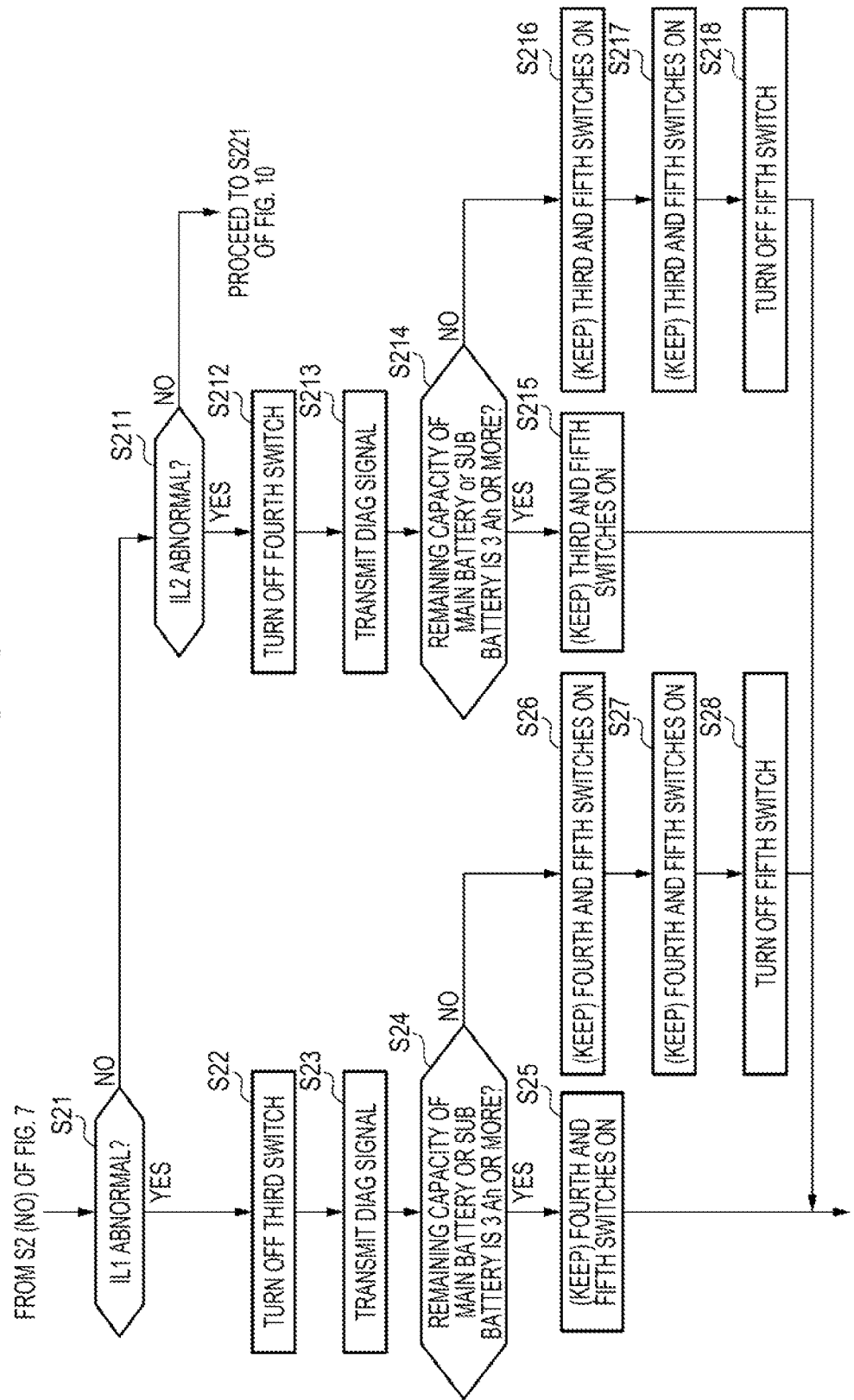
FIG. 9 is a flowchart for illustrating a process of the power switching control system of FIG. 1.

In step S21 of FIG. 9, the second power failure determination unit 32 determines whether the measurement value of the third current or voltage sensor 18 corresponding to the important load IL1 is an abnormal value. If an affirmative determination is made in step S21, the process proceeds to step S22, and if a negative determination is made in step S21, the process proceeds to step S211.

In step S211, the second power failure determination unit 32 determines whether the measurement value of the fourth current or voltage sensor 19 corresponding to the important load IL2 is an abnormal value. If an affirmative determination is made in step S211, the process proceeds to step S212, and if a negative determination is made in step S211, the process proceeds to step S221 of FIG. 10.

In step S22, the switch control unit 30 turns off the third switch 13 corresponding to the important load IL1. Next, in step S23, the switch control unit 30 transmits the DIAG signal to the ECU 7. Next, in step S24, the switch control unit 30 determines whether the remaining capacity [Ah] of the main battery 2 or the sub battery 3 is 3 Ah or more. If an affirmative determination is made in step S24 (if the remaining capacity [Ah] of at least one of the main battery 2 and the sub battery 3 is 3 Ah or more), the process proceeds to step S25, and if a negative determination is made in step S24, the process proceeds to step S26.

In step S25, the switch control unit 30 keeps the fourth and fifth switches 14 and 15 corresponding to the important loads IL2 and IL3 ON. The process proceeds from step S25 to step S4 of FIG. 7. Meanwhile, in step S26, the switch control unit 30 keeps the fourth and fifth switches 14 and 15 corresponding to the important loads IL2 and IL3 ON in the first stage (Time Step 1) of the evacuation driving time. Next, in step S27, the switch control unit 30 keeps the fourth and fifth switches 14 and 15 corresponding to the important loads IL2 and IL3 ON in the second stage (Time Step 2) of the evacuation driving time. Next, in step S28, the switch control unit 30 turns off the fifth switch 15 corresponding to the important load IL3 in the third stage (Time Step 3) of the evacuation driving time. The process proceeds from step S28 to step S4 of FIG. 7.

In step S212, the switch control unit 30 turns off the fourth switch 14 corresponding to the important load IL2. Next, in step S213, the switch control unit 30 transmits the DIAG signal to the ECU 7. Next, in step S214, the switch control unit 30 determines whether the remaining capacity [Ah] of the main battery 2 or the sub battery 3 is 3 Ah or more. If an affirmative determination is made in step S214, the process proceeds to step S215, and if a negative determination is made in step S214, the process proceeds to step S216.

In step S215, the switch control unit 30 keeps the third and fifth switches 13 and 15 corresponding to the important loads IL1 and IL3 ON. The process proceeds from step S215 to step S4 of FIG. 7. Meanwhile, in step S216, the switch control unit 30 keeps the third and fifth switches 13 and 15 corresponding to the important loads IL1 and IL3 ON in the first stage (Time Step 1) of the evacuation driving time. Next, in step S217, the switch control unit 30 keeps the third and fifth switches 13 and 15 corresponding to the important loads IL1 and IL3 ON in the second stage (Time Step 2) of the evacuation driving time. Next, in step S218, the switch control unit 30 turns off the fifth switch 15 corresponding to the important load IL3 in the third stage (Time Step 3) of the evacuation driving time.

Figure 7:
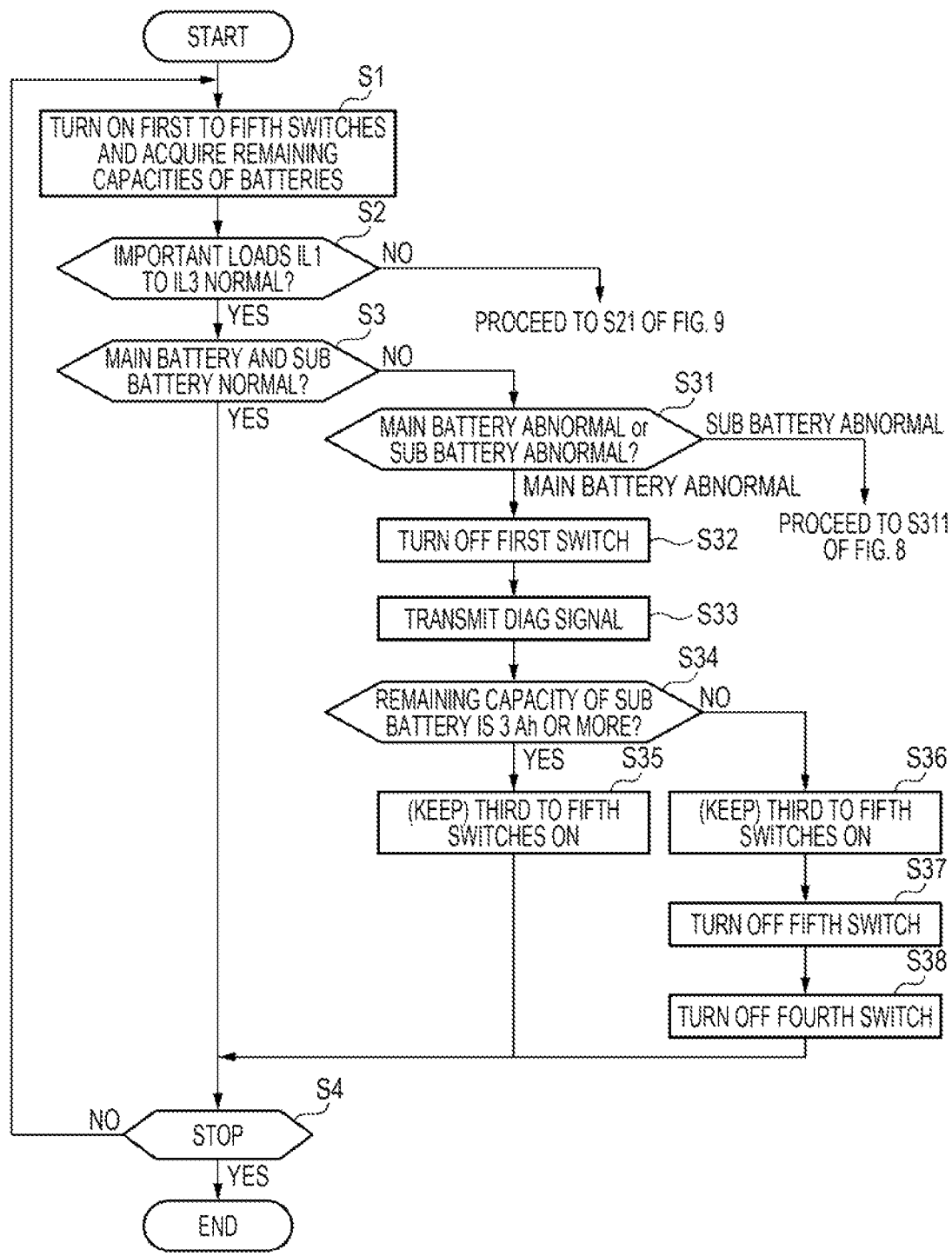
FIG. 7 is a flowchart for illustrating a process of the power switching control system of FIG. 1.

The process proceeds from step S218 to step S4 of FIG. 7.

Figure 10:
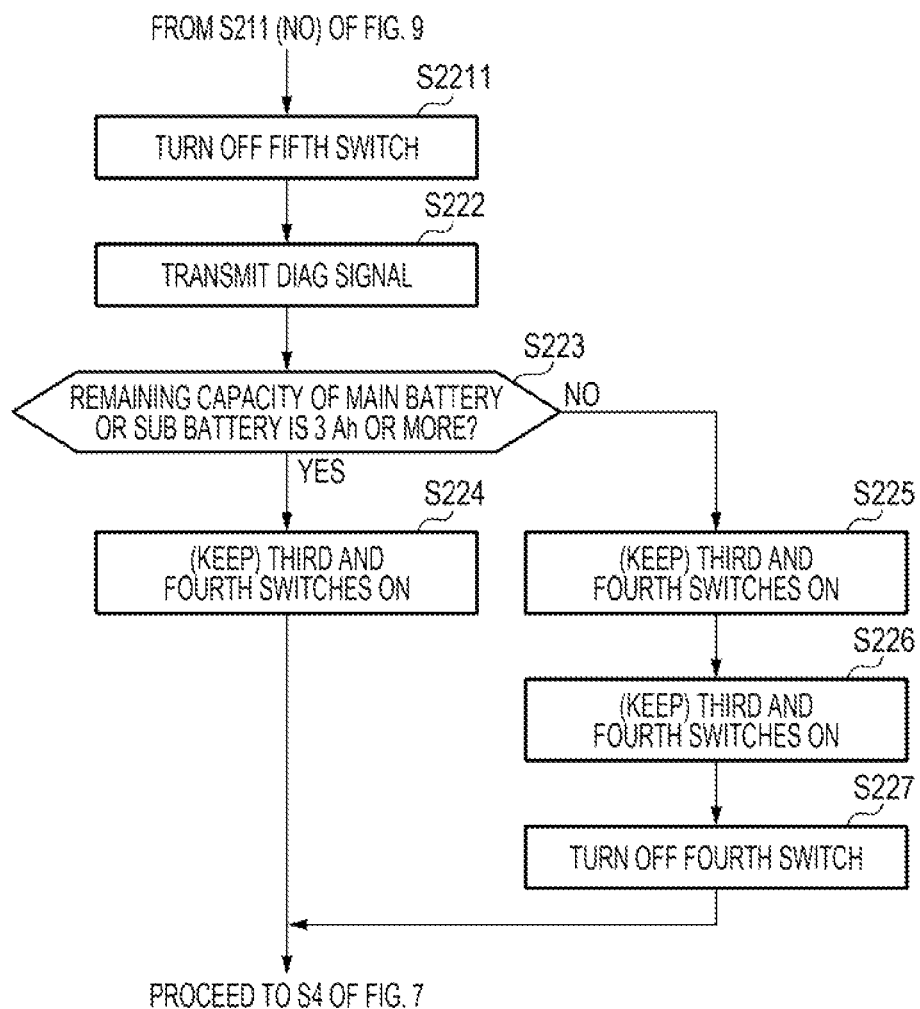
FIG. 10 is a flowchart for illustrating a process of the power switching control system of FIG. 1.

In step S221 of FIG. 10, the switch control unit 30 turns off the fifth switch 15 corresponding to the important load IL3. Next, in step S222, the switch control unit 30 transmits the DIAG signal to the ECU 7. Next, in step S223, the switch control unit 30 determines whether the remaining capacity [Ah] of the main battery 2 or the sub battery 3 is 3 Ah or more. If an affirmative determination is made in step S223, the process proceeds to step S224, and if a negative determination is made in step S223, the process proceeds to step S225.

In step S224, the switch control unit 30 keeps the third and fourth switches 13 and 14 corresponding to the important loads IL1 and IL2 ON. The process proceeds from step S224 to step S4 of FIG. 7. Meanwhile, in step S225, the switch control unit 30 keeps the third and fourth switches 13 and 14 corresponding to the important loads IL1 and IL2 ON in the first stage (Time Step 1) of the evacuation driving time. Next, in step S226, the switch control unit 30 keeps the third and fourth switches 13 and 14 corresponding to the important loads IL1 and IL2 ON in the second stage (Time Step 2) of the evacuation driving time. Next, in step S227, the switch control unit 30 turns off the fourth switch 14 corresponding to the important load IL2 in the third stage (Time Step 3) of the evacuation driving time.

The process proceeds from step S227 to step S4 of FIG. 7.

As described above, in the power switching control system 10 of the present embodiment, when the first power failure determination unit 31 or the second power failure determination unit 32 determines the power failure due to the abnormality on the main battery 2 side, the sub battery 3 side, or the important loads IL1 to IL3 side, the switch control unit 30 determines whether the remaining capacities [Ah] of both the main battery 2 and the sub battery 3 are equal to or higher than the predetermined threshold. The switch control unit 30 disconnects the abnormal one between the main battery 2 and the sub battery 3 by the first and second switches 11 and 12. When the remaining capacities [Ah] of both the main battery 2 and the sub battery 3 are less than the predetermined threshold, the switch control unit 30 disconnects the important loads IL1 to IL3 by the third to fifth switches 13 to 15 in an order from the one with the lowest operation priority, thereby gradually reducing the supply currents to the important loads IL1 to IL3.

Accordingly, during the evacuation driving time after the power failure occurs due to the abnormality on the main battery 2 side or the sub battery 3 side, the discharge times of the main battery 2 and the sub battery 3 whose remaining capacities [Ah] are smaller than those in the fully charged state can be extended to maintain the power supply to the important load IL1 (or IL2) with a high operation priority.

In addition, when the second power failure determination unit 32 determines the power failure due to the abnormalities on the important loads IL1 to IL3 sides, the switch control unit 30 determines whether the remaining capacities [Ah] of both the main battery 2 and the sub battery 3 are equal to or higher than the predetermined threshold. Further, the switch control unit 30 disconnects the important loads IL1 to IL3 having the abnormalities by the third to fifth switches 13 to 15. When the remaining capacities [Ah] of both the main battery 2 and the sub battery 3 are less than the predetermined threshold, the switch control unit 30 disconnects the normal important loads IL1 to IL3 by the third to fifth switches 13 to 15 in the order from the one with the lowest operation priority, thereby gradually reducing the supply currents to the important loads IL1 to IL3.

Accordingly, during the evacuation driving time after the power failure occurs due to the abnormality on any side of the important loads IL1 to IL3, the discharge times of the main battery 2 and the sub battery 3 whose remaining capacities [Ah] are smaller than those in the fully charged state can be extended to maintain the power supply to the normal important load IL1 (or IL2) with a high operation priority.

In the above embodiment, there is an unexpected case (so-called double failure) where the first power failure determination unit 31 determines the power failure due to the abnormality on the main battery 2 or sub battery 3 side, and the second power failure determination unit 32 determines the power failure due to the abnormalities on the important loads IL1 to IL3. However, when the second power failure determination unit 32 determines the power failure due to the abnormalities on the important loads IL1 to IL3, and the first power failure determination unit 31 determines the power failure due to the abnormality on the main battery 2 side or the sub battery 3 side, the remaining capacity [Ah] of the normal one between the main battery 2 and the sub battery 3 may be confirmed, and the normal one of the important loads IL1 to IL3 may be operated by the power supply from the normal battery.

Figure 11:
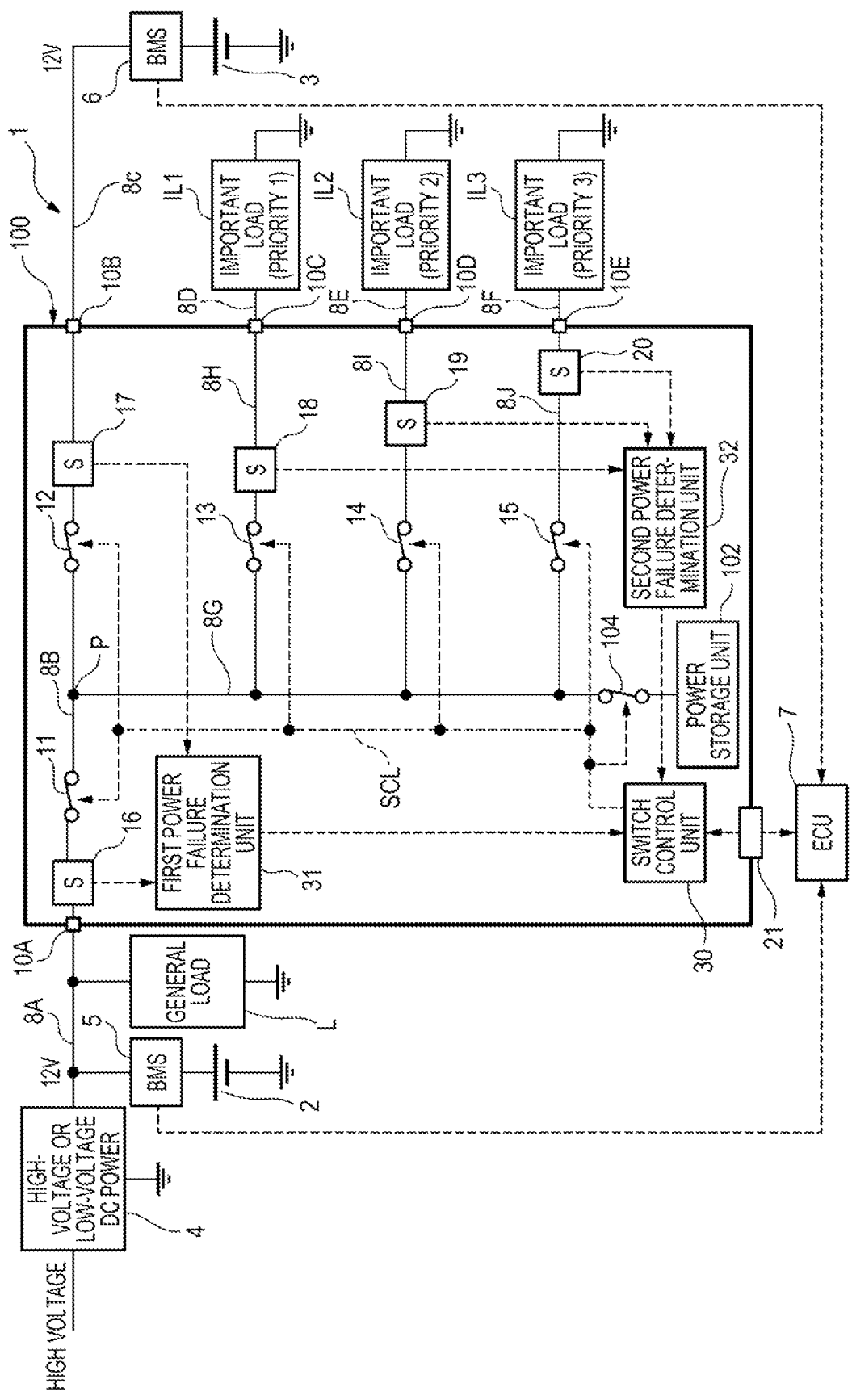
FIG. 11 is a diagram showing the in-vehicle power system including a power switching control system according to another embodiment of the present disclosure.

FIG. 11 is a diagram showing the in-vehicle power system 1 including a power switching control system 100 according to another embodiment of the present disclosure. As shown in FIG. 11, the power switching control system 100 of the present embodiment includes a power storage unit 102 connected to an end (opposite side of the connection point P which is a start end) of the power supply line 8G, and a sixth switch 104 that connects or disconnects the power storage unit 102 and the power supply line 8G. For the same configuration as the above embodiment, the duplicate description will be omitted, and the description of the above embodiment will be incorporated.

Examples of the power storage unit 102 include a 12 V lead battery, a 12 V lithium ion battery or nickel hydrogen battery that can be connected to the lead battery, or an electric double layer capacitor (including a built-in DC/DC converter). The power storage unit 102 is a redundant power that supplies the power to the important loads IL1 to IL3 when the power failure occurs in both the main battery 2 and the sub battery 3. Therefore, the switch control unit 30 keeps the power storage unit 102 always fully charged by keeping the sixth switch 104 always ON.

Figure 12:
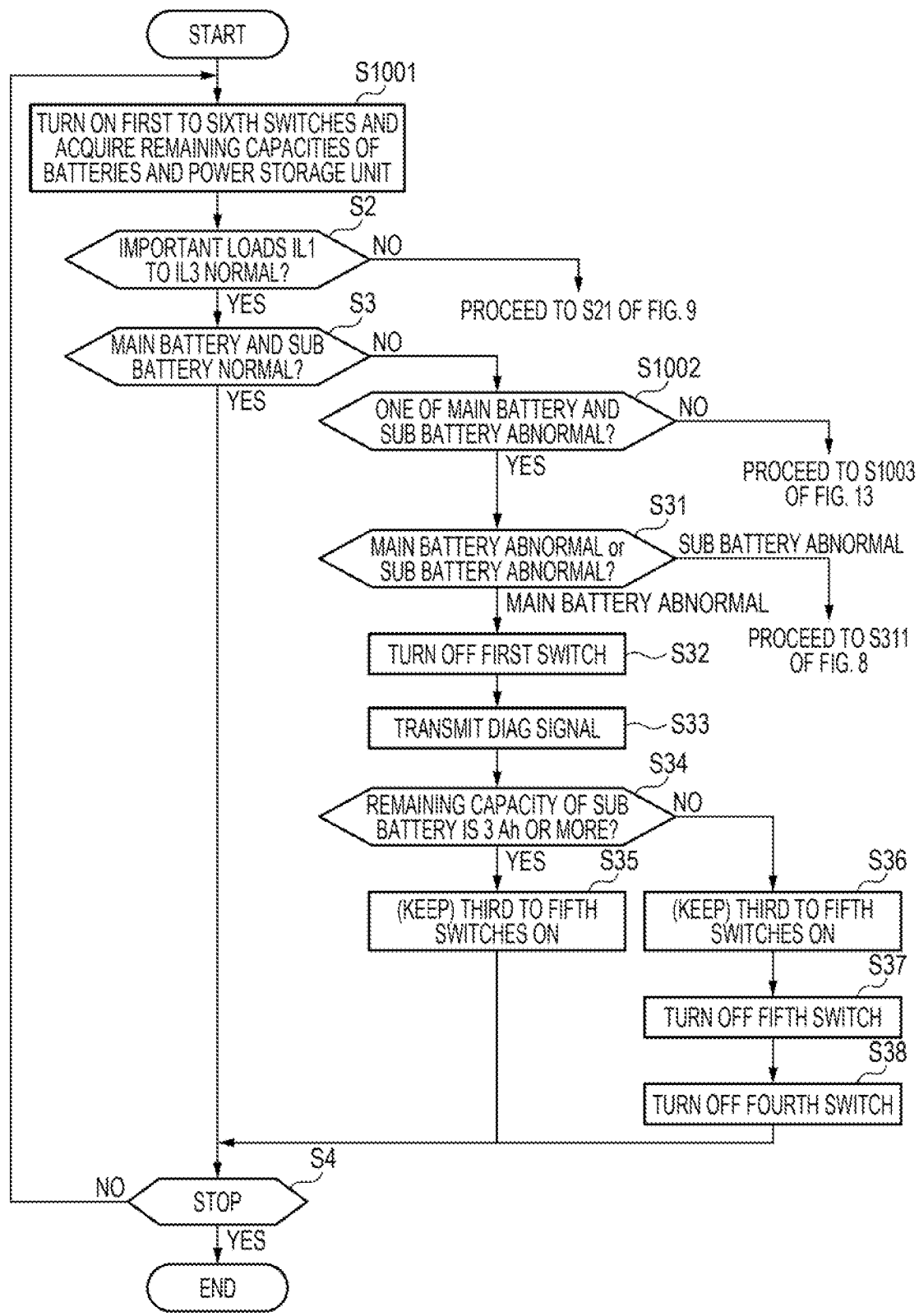
FIG. 12 is a flowchart for illustrating a process of the power switching control system of FIG. 11.
Figure 13:
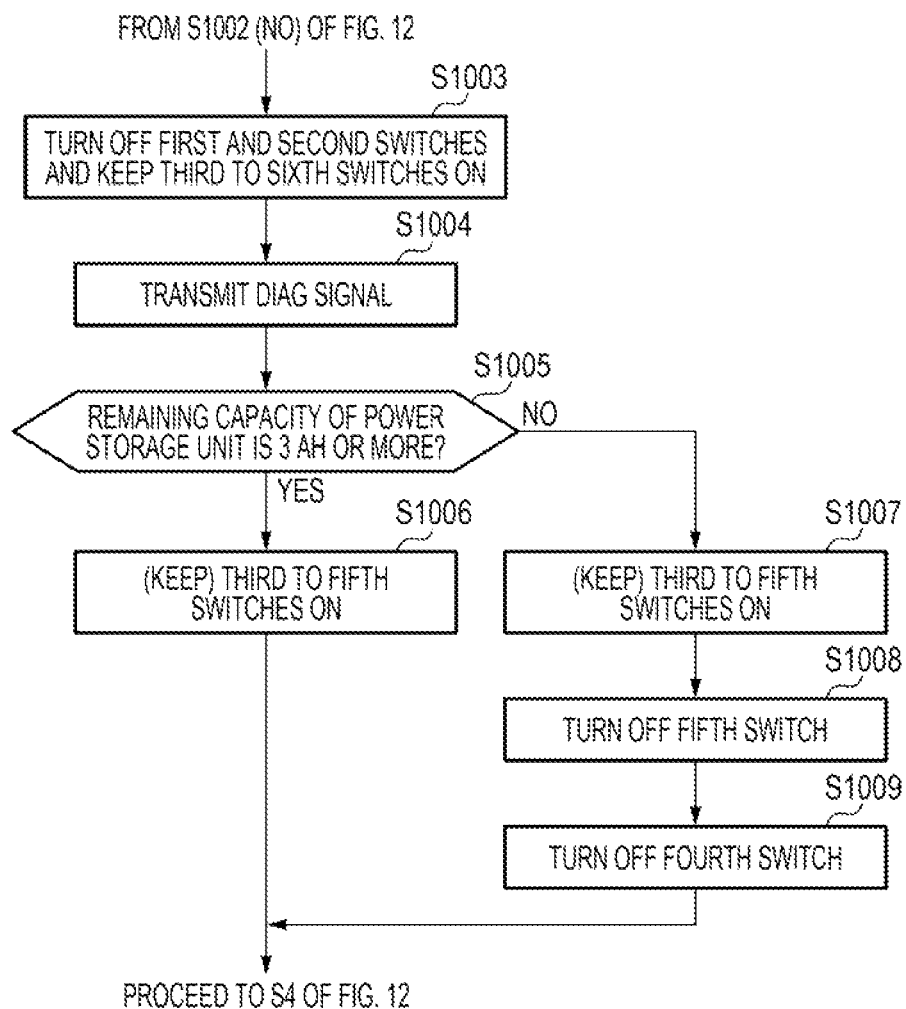
FIG. 13 is a flowchart for illustrating a process of the power switching control system of FIG. 11.

FIG. 12 and FIG. 13 are flowcharts for illustrating processes of the power switching control system 100 of the present embodiment. The processes shown in the flowcharts are started when the vehicle starts, and the process proceeds to step S1001. For the same processes as the above embodiment, the duplicate description will be omitted, and the description of the above embodiment will be incorporated.

In step S110, the switch control unit 30 turns on all the first to sixth switches 11 to 15 and 104. Accordingly, the main battery 2 and the sub battery 3 are connected to the general load L, the important loads IL1 to IL3, and the power storage unit 102, and supply the power to the general load L, the important loads IL1 to IL3, and the power storage unit 102. The switch control unit 30 acquires, from the ECU 7, the information on the remaining capacity [Ah] of the main battery 2 held by the BMS 5 and the information on the remaining capacity [Ah] of the sub battery 3 held by the BMS 6, and acquires information on a remaining capacity [Ah] of the power storage unit 102.

Next, in step S2, the second power failure determination unit 32 determines whether all the important loads IL1 to IL3 are in the (normal) state where the abnormality such as an overcurrent does not occur. If the affirmative determination is made in step S2, the process proceeds to step S3, and if the negative determination is made in step S2, the process proceeds to step S21 in FIG. 9.

In step S3, the first power failure determination unit 31 determines whether both the main battery 2 side and the sub battery 3 side are in a (normal) state where no abnormality causing the power failure is present. If the affirmative determination is made in step S3, the process proceeds to step S4, and if the negative determination is made in step S3, the process proceeds to step S1002.

In step S4, the switch control unit 30 determines whether the vehicle stops. If the affirmative determination is made in step S4, the process ends, and if the negative determination is made in step S4, the process proceeds to step S1001.

In step S102, the switch control unit 30 determines whether the power failure occurs due to the abnormality on one of the main battery 2 side and the sub battery 3 side. If an affirmative determination is made in step S1002, the process proceeds to step S31, and if a negative determination is made in step S1002 (if the power failure occurs due to the abnormalities on both the main battery 2 side and the sub battery 3 side), the process proceeds to step S1003 of FIG. 13.

The processes of steps S31 to S38 are processes when the power failure occurs due to the abnormality on the main battery 2 side, and are the same as those of the above embodiment. The processes of steps S311 to S317 of FIG. 8 after the negative determination is made in S31 are processes when the power failure occurs due to the abnormality on the sub battery 3 side, and are the same as those of the above embodiment.

In step S1003 of FIG. 13, the switch control unit 30 turns off the first and second switches 11 and 12 and keeps the third to sixth switches 13 to 15 and 104 ON. Next, in step S1004, the switch control unit 30 transmits the DIAG signal to the ECU 7.

Next, in step S1005, the switch control unit 30 determines whether the remaining capacity [Ah] of the power storage unit 102 is 3 Ah or more. If an affirmative determination is made in step S1005, the process proceeds to step S1006, and if a negative determination is made in step S1005, the process proceeds to step S1007.

In step S1006, the switch control unit 30 keeps the third to fifth switches 13 to 15 ON, and maintains the power supply from the power storage unit 102 to the important loads IL1 to IL3. The process proceeds from step S1006 to step S4 of FIG. 12. Meanwhile, in step S1007, the switch control unit 30 keeps the third to fifth switches 13 to 15 ON in the first stage (Time Step 1) of the evacuation driving time. Next, in step S1008, the switch control unit 30 turns off the fifth switch 15 in the second stage (Time Step 2) of the evacuation driving time. Next, in step S1009, the switch control unit 30 turns off the fourth switch 14 in the third stage (Time Step 3) of the evacuation driving time. The process proceeds from step S1009 to step S4 of FIG. 12.

As described above, in the power switching control system 100 of the present embodiment, the power storage unit 102 is provided as a redundant power, and when the abnormalities causing the power failure occur in both the main battery 2 and the sub battery 3, the power storage unit 102 supplies the power to the important loads IL1 to IL3. In the power switching control system 100 of the present embodiment, when the first power failure determination unit 31 determines that the power failure occurs due to the abnormalities on both the main battery 2 side and the sub battery 3 side, the switch control unit 30 determines whether the remaining capacity [Ah] of the power storage unit 102 is equal to or higher than the predetermined threshold. When the remaining capacity [Ah] of the power storage unit 102 is less than the predetermined threshold, the switch control unit 30 disconnects the important loads IL1 to IL3 by the third to fifth switches 13 to 15 in the order from the one with the lowest operation priority, thereby gradually reducing the supply currents to the important loads IL1 to IL3.

Accordingly, during the evacuation driving time after the power failure occurs due to the abnormalities on both the main battery 2 side and the sub battery 3 side, a discharge time of the power storage unit 102 whose remaining capacity [Ah] is smaller than that in the fully charged state can be extended to maintain the power supply to the important load IL1 (or IL2) with a high operation priority.

In a current in-vehicle power system, since a power storage unit is provided for each important load to maintain a power supply to an important load, the number of power storage units is increasing. However, according to the power switching control system 10 of the present embodiment, the power supply to the important loads IL1 and IL2 can be maintained by ON and OFF controls of the first to fifth switches 11 to 15 with only two members of the main battery 2 and the sub battery 3, or three members including the power storage unit 102 provided in the power switching control system 10.

Although the present disclosure has been described above based on the above embodiments, the present disclosure is not limited to the above embodiments. Modifications may be added to the above embodiments without departing from the gist of the present disclosure, or known and well-known techniques may be combined as appropriate.

For example, in the above embodiments, three important loads IL1 to IL3 are provided, but the number of important loads IL1 to IL3 may be increased or decreased as appropriate. When the two important loads IL1 and IL2 are provided, during the evacuation driving time after the power failure occurs due to the abnormality on the main battery 2 side or the sub battery 3 side, the one with the lower operation priority of the two important loads IL1 and IL2 may be disconnected from the power switching control system 10 or 100.

In the above embodiments, when the remaining capacities [Ah] of the main battery 2, the sub battery 3, and the power storage unit 102 are less than predetermined thresholds, the control in the evacuation driving time during which the important loads IL1 to IL3 are disconnected in an order from the one with the lowest operation priority is executed. However, for example, when the remaining capacities [Ah] of the main battery 2, the sub battery 3, and the power storage unit 102 are equal to or less than the predetermined thresholds, the control in the above evacuation driving time may be executed. Further, when the charging rates (SOC) or voltages of the main battery 2, the sub battery 3, and the power storage unit 102 are less than, or equal to or less than predetermined thresholds, the control in the above evacuation driving time may be executed.

According to a first aspect of the present disclosure, a power switching control system (10), includes a switching unit (11, 12, 13, 14, 15) configured to switch connection and disconnection between a plurality of loads (IL1, IL2, IL3) set with operation priorities and a plurality of powers (2, 3, 102) supplying powers to the plurality of loads (IL1, IL2, IL3), the plurality of loads (IL1, IL2, IL3) and the plurality of powers (2, 3, 102) being connected in parallel to a power supply path (8G); a power failure detection unit (31, 32) configured to detect a power failure caused by an abnormality on a power supply side or a load side; and a control unit (30) configured to control the switching unit (11, 12, 13, 14, 15). When the power failure detection unit (31, 32) detects the power failure, and remaining capacities, charging rates, or voltages of the plurality of powers (2, 3, 102) are less than, or equal to or less than predetermined thresholds, the control unit (30) disconnects the plurality of loads (IL1, IL2, IL3) from the power supply path (8G) by the switching unit (11, 12, 13, 14, 15) in an order from one of the loads (IL1, IL2, IL3) with a lowest operation priority of the operation priorities to gradually decrease supply currents from the powers (2, 3, 102) to the loads (IL1, IL2, IL3).

According to a second aspect of the present disclosure, the loads (IL1, IL2, IL3) are three or more, and when the power failure detection unit (31, 32) detects the power failure caused by the abnormality on the load side, and the remaining capacities, the charging rates, or the voltages of the plurality of powers (2, 3, 102) are less than, or equal to or less than the predetermined thresholds, the control unit (30) disconnects at least one of the loads (IL1, IL2, IL3) having the abnormality from the power supply path (8G) by the switching unit (11, 12, 13, 14, 15), and then disconnects the two or more normal loads (IL1, IL2, IL3) from the power supply path (8G) by the switching unit (11, 12, 13, 14, 15) in the order from the one of the loads (IL1, IL2, IL3) with the lowest operation priority to gradually decrease the supply currents from the powers (2, 3, 102) to the loads (IL1, IL2, IL3).

According to a third aspect of the present disclosure, the plurality of powers (2, 3, 102) include a main battery (2), a sub battery (3), and a power storage unit (102). The switching unit (11, 12, 13, 14, 15) includes a first switch (11) configured to switch connection and disconnection between the main battery (2) and the power supply path (8G), a second switch (12) configured to switch connection and disconnection between the sub battery (3) and the power supply path (8G), and a plurality of third switches (13, 14, 15) configured to switch connection and disconnection between the loads (IL1, IL2, IL3) and the power supply path (8G). The control unit (30) is configured to execute: a first process in which when the power failure detection unit (31, 32) detects the power failure caused by an abnormality on a main battery side and the power failure caused by an abnormality on a sub battery side, the first switch (11) disconnects the main battery (2) from the power supply path (8G), the second switch (12) disconnects the sub battery (3) from the power supply path (8G), and the power storage unit (102) supplies the power to the loads (IL1, IL2, IL3), and after the first process, a second process in which when a remaining capacity, a charging rate, or a voltage of the power storage unit (102) is less than, or equal to or less than the predetermined threshold, the third switches (13, 14, 15) disconnect the plurality of loads (IL1, IL2, IL3) from the power supply path (8G) in the order from the one of the loads (IL1, IL2, IL3) with the lowest operation priority to gradually decrease a supply current from the power storage unit (102) to the loads (IL1, IL2, IL3).

According to the present disclosure, in the power system where the plurality of powers are connected in parallel to the power supply path for the redundant operation and the plurality of loads are connected in parallel to the power supply path, when the power failure occurs due to the abnormality on the power side or the load side, even if the remaining capacity of the power in the state where the power can be supplied is insufficient, the power supplied to the load with the high operation priority can be maintained for the required time.

What is claimed is:

1. A power switching control system, comprising:
a switching unit configured to switch connection and disconnection between a plurality of loads set with operation priorities and a plurality of powers supplying powers to the plurality of loads, the plurality of loads and the plurality of powers being connected in parallel to a power supply path;
a power failure detection unit configured to detect a power failure caused by an abnormality on a load side; and
a control unit configured to control the switching unit, wherein
when the power failure detection unit detects the power failure, the control unit disconnects the plurality of loads from the power supply path by the switching unit in an order from one of the loads with a lowest operation priority of the operation priorities to gradually decrease supply currents from the powers to the loads,
the plurality of powers include a main battery, a sub battery, and a power storage unit,
the switching unit includes a first switch configured to switch connection and disconnection between the main battery and the power supply path, a second switch configured to switch connection and disconnection between the sub battery and the power supply path, and a plurality of third switches configured to switch connection and disconnection between the loads and the power supply path, and
the control unit is configured to execute:
a first process in which when the power failure detection unit detects the power failure caused by an abnormality on a main battery side and the power failure caused by an abnormality on a sub battery side, the first switch disconnects the main battery from the power supply path, the second switch disconnects the sub battery from the power supply path, and the power storage unit supplies the power to the loads, and
after the first process, a second process in which when a remaining capacity, a charging rate, or a voltage of the power storage unit is less than, or equal to or less than the predetermined threshold, the third switches disconnect the plurality of loads from the power supply path in the order from the one of the loads with the lowest operation priority to gradually decrease a supply current from the power storage unit to the loads.

2. The power switching control system according to claim 1, wherein
the loads are three or more, and
when the power failure detection unit detects the power failure caused by the abnormality on the load side, and the remaining capacities, the charging rates, or the voltages of the plurality of powers are less than, or equal to or less than the predetermined thresholds, the control unit disconnects at least one of the loads having the abnormality from the power supply path by the switching unit, and then disconnects the two or more normal loads from the power supply path by the switching unit in the order from the one of the loads with the lowest operation priority to gradually decrease the supply currents from the powers to the loads.

3. A power switching control system, comprising:
a switching unit configured to switch connection and disconnection between a plurality of loads set with operation priorities and a plurality of powers supplying powers to the plurality of loads, the plurality of loads and the plurality of powers being connected in parallel to a power supply path;
a power failure detection unit configured to detect a power failure caused by an abnormality on a power supply side or a load side; and
a control unit configured to control the switching unit, wherein
when the power failure detection unit detects the power failure, and remaining capacities, charging rates, or voltages of the plurality of powers are less than, or equal to or less than predetermined thresholds, the control unit disconnects the plurality of loads from the power supply path by the switching unit in an order from one of the loads with a lowest operation priority of the operation priorities to gradually decrease supply currents from the powers to the loads, wherein
the plurality of powers include a main battery, a sub battery, and a power storage unit,
the switching unit includes a first switch configured to switch connection and disconnection between the main battery and the power supply path, a second switch configured to switch connection and disconnection between the sub battery and the power supply path, and a plurality of third switches configured to switch connection and disconnection between the loads and the power supply path, and
the control unit is configured to execute:
a first process in which when the power failure detection unit detects the power failure caused by an abnormality on a main battery side and the power failure caused by an abnormality on a sub battery side, the first switch disconnects the main battery from the power supply path, the second switch disconnects the sub battery from the power supply path, and the power storage unit supplies the power to the loads, and
after the first process, a second process in which when a remaining capacity, a charging rate, or a voltage of the power storage unit is less than, or equal to or less than the predetermined threshold, the third switches disconnect the plurality of loads from the power supply path in the order from the one of the loads with the lowest operation priority to gradually decrease a supply current from the power storage unit to the loads.

* * * * *